United States Patent [19]

Murphy et al.

[11] Patent Number: 4,793,830

[45] Date of Patent: Dec. 27, 1988

[54] PROCESS FOR PRODUCING HIGH QUALITY GAS FOR INSTRUMENTATION APPLICATION USING GAS SEPARATION MEMBRANES

[76] Inventors: Milton K. Murphy, 666 Langton Dr., Clayton, Mo. 63105; Arthur W. Rice, 1733 Duello Rd., O'Fallon, Mo. 63366; John J. Freeman, 125 Orchard Ave., Webster Groves, Mo. 63119

[21] Appl. No.: 137,899

[22] Filed: Dec. 28, 1987

[51] Int. Cl.$^4$ ............................................. B01D 53/22
[52] U.S. Cl. ........................................ 55/16; 55/68; 55/158; 55/270
[58] Field of Search ............... 55/16, 68, 158, 270, 55/18; 73/23, 29

[56] References Cited

U.S. PATENT DOCUMENTS

| | | | |
|---|---|---|---|
| 3,367,850 | 2/1968 | Johnson | 55/16 X |
| 3,699,342 | 10/1972 | Jenkins et al. | 55/16 X |
| 3,923,461 | 12/1975 | Barden | 55/16 X |
| 3,926,561 | 12/1975 | Lucero | 55/16 X |
| 4,230,463 | 10/1980 | Henis et al. | 55/71 X |
| 4,293,316 | 10/1981 | Block | 55/16 |
| 4,583,996 | 4/1986 | Sakata et al. | 55/16 |
| 4,612,019 | 9/1986 | Langhorst | 55/16 |
| 4,666,644 | 5/1987 | Watson | 55/16 X |
| 4,728,346 | 3/1988 | Murphy | 55/158 |

*Primary Examiner*—Robert Spitzer
*Attorney, Agent, or Firm*—Henry Croskell

[57] ABSTRACT

A process has been developed for effectively purifying compressed air by removing water vapor, carbon dioxide and other impurities through the use of gas separation membrane systems. Gas separation membranes have been found which are capable of purifying air to a suitable level for operation of analytical instrumentation apparatus such as Fourier Transform Infrared analytical spectrometers and related instrumentation equipment. Impurities normally found in compressed air used in operation and purging of instrumentation devices include water vapor and $CO_2$, which are strong absorbers of infrared radiation at wavelengths which interfere with analytical wavelengths and spectral regions commonly employed for analysis of a variety of organic and inorganic materials.

12 Claims, No Drawings

PROCESS FOR PRODUCING HIGH QUALITY GAS FOR INSTRUMENTATION APPLICATION USING GAS SEPARATION MEMBRANES

BACKGROUND OF THE INVENTION

This invention relates to a process which effectively removes impurities such as water vapor and $CO_2$ from commonly available compressed air through the use of gas separation membranes which provides an inexpensive source of gas needed for operation of analytical instrumentation such as Fourier Transform Infrared analytical spectrometers (FTIR). Such instruments need high quality gas for purging of the instrument optical compartments to insure the absence of impurities, such as water vapor and $CO_2$. These impurities cause serious problems when they are present at concentrations typical of ambient air or of commonly available compressed air utility sources in many laboratories. For example, FTIR instruments are used for analyses of samples by examination of their absorption spectra in the infrared wavelength region of the electromagnetic spectrum. Such instruments employ sensitive optical elements, such as salt crystals made of highly moisture sensitive materials. The presence of even modest levels of moisture degrades such optical components severely. Further, impurities such as water vapor and $CO_2$ are strong absorbers of infrared radiation, at wavelengths which interfere with analytical wavelengths and spectral regions commonly employed for analysis of a variety of organic and inorganic materials. Such strong interfering infrared absorptions, in addition to obscuring the spectra of samples, reduce instrument and analytical sensitivity by reducing the radiant energy intensity of the instrument's infrared optical source radiation by strongly absorbing the source energy before it can pass through the analytical sample.

Modern instrumentation such as the FTIR spectrometers operate on the principal of an interferometer and employ a moving mirror in the optical train in routine operation. Such moving mirror elements execute motion of the moving mirror element by floating of the mirror's piston drive on a gas bearing to eliminate friction and vibration effects. Gas employed to float and activate such gas bearings actually exhausts into the instrument's optical compartment and thus must be of high quality and free of contaminating impurities. Presently, users of such analytical instruments can obtain operating gases, either nitrogen gas or clean air from sources such as purified tank gas, liquid nitrogen boil off, or pressure swing desiccant treated compressed air systems. All of these sources have limitations in terms of convenience, cost or practical operational limitations.

Purified compressed tank supplies of gas, for example, are expensive due to the high volumes of purge and operating gas routinely employed in instrument operation. Such high volumes of gas used also result in inconvenience to the operator in frequency of tank replacement and connection which also increases the risk of introduction of impurities from the ambient environment during disconnect/reconnect procedures.

Pure nitrogen gas supplied from typical lab utility sources such as from liquid nitrogen boil off is commonly available at pressures which are only marginally adequate for operation of the gas bearing for the moving mirror optical elements, such as described for FTIR spectrometers. Compression of such liquid nitrogen boil off to higher pressures is possible, but entails the risk of the addition of impurities in such compressor systems. Commonly available utility nitrogen from boil off is often at pressure of about 30 psig to 35 psig ($4.35-5.08 \times 10^3$ Pa). Many moving mirror optical elements in modern FTIR spectrometers require a minimum pressure of about 28-30 psig ($4.06-4.35 \times 10^3$ Pa) to effectively float the gas bearing of the moving piston drive mechanism. When multiple supply taps from the same nitrogen source are utilized at different times, the line pressure frequently falls, at least temporarily below that needed to float the FTIR gas bearing, thus interrupting and compromising routine instrument operation and useability.

Several commercially available apparatus permit the production of high quality instrument operating gas by removal of water vapor and $CO_2$ from commonly available compressed air, where such units employ absorption desiccant beds to effect such impurity removal. Such desiccant units operate using two beds of a solid absorbent or adsorbent material operating under the principle of cyclic pressure swing processes. These units typically employ one desiccant bed online while a second bed undergoes cyclic regeneration. Units cycle typically every few minutes, involving substantial noise and vibration each time a bed is depressurized and require relatively frequent recharge of the sorbent solid material, especially those which remove carbon dioxide. These units create considerable nuisance and operational inconvenience and expense for the user.

SUMMARY OF THE INVENTION

Impurity components of a feed gas stream utilized by instrumentation systems, which are deemed harmful to the operation of for example FTIR analysis equipment, are removed from the feed gas source prior to introduction to the instrument through the use of gas separation membrane systems. Polymeric membrane systems, which permeate and remove water vapor and $CO_2$ impurities from compressed air sources, are capable of purification levels necessary for satisfactory operation of FTIR. The purification of compressed air sources using gas separation membrane systems has been found to satisfy operation requirements of analytical instrumentation including purge uses.

DETAILED DESCRIPTION OF THE INVENTION

In general, the passage of a gas through a membrane may proceed through pores, i.e., continuous channels for fluid flow in communication with both feed and exit surfaces of the membrane (which pores may or may not be suitable for separation by Knudsen flow or diffusion). In another mechanism in accordance with current views of membrane theory, the passage of a gas through the membrane may be by interaction of the gas with the material of the membrane. In this latter postulated mechanism, the permeability of a gas through a membrane is believed to involve the solubility of the gas in the membrane material and the diffusion of the gas through the membrane. The permeability constant for a single gas is presently viewed as being the product of the solubility and diffusivity of that gas in the membrane. A given membrane material has a particular permeability constant for passage of a given gas by the interaction of the gas with the material of the membrane. The rate of permeation of the gas, i.e., flux through the membrane, is related to the permeability constant, but is also influenced by variables such as the membrane thickness, density, free volume, the physical nature of the membrane, the partial pressure differential of the permeate gas across the membrane, the temperature and the like.

Gas separation membranes were addressed by Henis and Tripodi as taught in their U.S. Pat. No. 4,230,463, herein incorporated by reference, whereby a multicomponent membrane for gas separation comprised of a coating in contact with a porous separation membrane was taught with the separation properties of the multicomponent membrane being principally determined by the materials of the porous separation membrane as opposed to the membrane material of the coating. More recently, gas separation membranes have been further addressed and improved by Kesting et al as taught in U.S. patent application Ser. No. 66,752 filed July 6, 1987, hereby incorporated by reference. Kesting and his co-workers developed an asymmetric gas separation membrane having graded density skin and macrovoid-free morphology comprised of glassy, hydrophobic polymers where the membranes have increased free volume as evidenced by the membrane first heat $T_g$ which is greater than the first heat $T_g$ of a bulk sample of the glassy, hydrophobic polymers. The membranes exhibit high permeabilities and the potential for intrinsic separation factors realized after the porous defects of the membrane are sealed with a highly permeable silicone polymer or similar coating material. The membranes exhibit permeabilities which are much greater than those of state-of-the-art, asymmetric membranes with the same polymer, for example, as taught by Henis et al.

Coatings may be in the form of an essentially non-interrupted membrane, i.e., an essentially nonporous membrane, in contact with the graded density skinned membrane, or the coating may be discontinuous, or interrupted. When the coating is interrupted, it is sometimes referred to as an occluding material since it may occlude channels for gas flow, i.e., pores. Preferably the coating is not so thick as to adversely affect the performance of the graded density skinned membrane, e.g., by causing an undue decrease in flux or by causing such a resistance to gas flow that separation factor of the coated membrane is essentially that of the coating. Often the coating may have an average thickness of up to about 10 micrometers.

In practice, the transport properties with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors are disclosed by Hwang, et al., *Techniques of Chemistry*, Volume VII, *Membrane in Separations*, John Wiley & Sons, 1975 (herein incorporated by reference) at Chapter 12, pages 296 to 322.

In practical terms, the permeability and separation properties of a membrane system must be sufficient to effectively remove impurities from the feed compressed air while providing adequate efficiency of production of purified gas for use in the operation and purge of instrumentation apparatus such as FTIR. Permeability of water vapor and carbon dioxide must be sufficiently high to achieve purification of contaminated feed compressed air to yield a product gas of extremely low dewpoint and low residual $CO_2$ concentration. Selectivity properties must be sufficiently high, i.e., for selective transport of water vapor and $CO_2$ relative to air, such that excessive loss of feed is avoided in order to provide a membrane air purification system which is of practical small size and cost so that the process will be economically attractive. The membrane systems and process of the present invention meet these stringent demands.

Conventional approaches to effective practical utilization of membrane systems for treatment of gaseous mixtures have been constrained almost entirely to only a partial separation of components in the mixture or to situations which afford high transmembrane driving force for transport of the mixture component of higher permeability. Limitations of inferior membrane performance has often led even the most skillful students of the art of membrane technology to the somewhat dogmatic view that membrane systems were fundamentally limited in their capabilities to perform separations requiring purifications to high degree, especially where very little driving force is available across the separatory membrane. For example, in the opening remarks to recent landmark treatise in the field, entitled *Membranes in Separations*, Techniques in Chemistry, Vol. VII, Wiley-Interscience, 1975, by S. Hwang and K. Kammermeyer, at page xix (herein incorporated by reference), the authors state, in the context of membrane separation, "... that the process is almost always one resulting in partial enrichment. Consequently, the usual installation will contain multiple stages." Hwang and Kammermeyer do give an example, in Chapter XV of this reference at pages 461–464, of asymmetric membranes employed for purification of helium from a feed gas comprised of about 5–6% helium in natural gas. However, that process in fact required a multistage/recycle membrane system and utilized high pressure (850–950 psig, $1.23-1.38 \times 10^5$ Pa) compression of the helium containing feed gas to obtain workable transmembrane driving force for helium permeation. Yet, the system still recovered only 62% of the helium contained in the feed gas. By contrast, the membrane purification system and process of the present invention effectively purifies feed air to extreme levels of purity required for demanding instrumentation applications. As described in detail in subsequent sections, the membrane systems and process have been found to have practical utility for generation of high quality gas for instrumentation application when operated using only a single stage without recycle and for feed gas at relatively low pressure (about 100 psig, $1.45 \times 10^4$ Pa), where very low permeant component driving force is available. For example, in the case of water vapor impurity, in 100 psig air having a dewpoint of about $+10°$ C. the partial pressure of water is only about 9 mmHg and corresponding to only about 0.15% by volume under these conditions. Achievement of water vapor removal from such a wet feed to produce a purified gas having as low as a $-70°$ C. dewpoint, as demonstrated in accordance with the present invention, corresponds to a product gas water vapor pressure of only about 0.002 mmHg or about 0.3 ppm (parts per million) by volume of water vapor. Similar though less dramatic degrees of purification are also observed with the present systems and process in the case of $CO_2$ impurity removal from the feed air, as described below in detail. This serves to demonstrate the unexpectedly effective and useful performance of the membrane systems and process of the present invention.

In the practice of the invention, a process for producing high quality gas for instrumentation application using gas separation membrane, a 2"×3' demonstration module containing hollow fiber gas separation membranes was utilized in generating the expected flow requirements of high quality product gas for instrumentation. Purified product gas flow rates of about 0.2 standard cubic feet per minute (SCFM) at dewpoints of less than about −70° C. were generated from feed compressed air at 100 psig (1.45×10⁴ Pa) having a dewpoint of +10 to about +20° C. through the use of gas separation membranes of this invention. Further, depending on specific product gas flow rate, product $CO_2$ concentration was decreased by from 20 to 50 fold, i.e., 95-98% removal, compared to $CO_2$ levels present in the feed air to the unit. Product gas was available as non-permeated gas from the module fiber bore, the module comprised of a bore feed double-ended design. The purified product gas underwent small or negligible pressure drop as it travels axially through the membrane unit and was produced at essentially the pressure of the feed gas, 100 psig (1.45×10⁴ Pa). As such, the pressure needed to float the moving mirror gas bearing and drive mechanism of the FTIR instrument was provided by a stepdown pressure regulator and proved adequate in terms of pressure, purity and flow for instrument operation.

After the initial evaluation of 2"×3' membrane module, additional options were considered including elevated temperature and the use of larger module systems for example a 4"×5' unit for obtaining higher product flows. A larger module system or elevated temperature would afford increased product gas flow. Elevated temperature is known to increase gas transport flux, at the expense of some decrease in separation factor. Testing was resumed at the FTIR laboratory with the larger 4"×5' membrane unit on the grounds of flexibility of operation control, simplicity and a greater opportunity to obtain response and performance variation information.

A 4"×5' membrane module was installed and operated under essentially the same conditions of feed compressed air pressure and relatively high dewpoint as described with the 2"×3' module. Non-permeate product gas was set at about 1 SCFM and the system was then allowed to run unattended to accomplish equilibrium before measurements commenced. Subsequent measurements of product gas composition showed that operating at feed compressed air pressures in the range of 90-150 psig (1.30-1.52×10⁴ Pa) at feed dewpoints of about +5 to +15° C. at ambient laboratory temperature of 20°-25° C. resulted in the unit producing high quality non-permeate product gas with very low dewpoints of less than about −70° C. and dramatically reduced $CO_2$ levels relative to inlet feed air compositions. Flow rates of product gas were tested so as to encompass both the 1 SCFM and 2 SCFM rates needed for utility gas support for either one or two FTIR instruments. Lower product gas flows allowed longer effective contact times between contaminated feed gas and the active membrane surface and thus at 1 SCFM product flow the resultant dewpoint and $CO_2$ levels in the product are lower than at the 2 SCFM rates. However, with the respect to product dewpoint, even the higher 2 SCFM flow rate generates product meeting the criteria of −70° C. dewpoint or less. With respect to $CO_2$ removal, operating tests at 1 SCFM showed $CO_2$ reduction by 130 fold i.e., more than 99% $CO_2$ removal, and tests at 2 SCFM showed carbon dioxide removal by more than 95% relative to $CO_2$ levels in the feed compressed air. Permeate rate for the two product flow conditions remained essentially the same, at about 2.2 SCFM.

A calibration gas mix of 27 parts per million by volume $CO_2$ in nitrogen was fed to a previously evacuated long path infrared analytical gas cell and the IR absorption was measured to accurately calibrate the instrument and cell to permit precise quantitative analysis of $CO_2$ in feed and product gases. This was the same long path IR cell and the same FTIR analytical instrument as was employed throughout the evaluations of the inventive process. Results of these calibration measurements served to place actual values on the levels of $CO_2$ in feed air and in product gas. The calibrations confirm and support fully the relative decreases in $CO_2$ level. For example, feed air was found to contain roughly 400-430 ppm $CO_2$. Membrane product gas at the time of measurement was found to have 3-4 ppm $CO_2$ when the unit was operating at about 1 SCFM product flow rate and about 16-19 ppm $CO_2$ when operated at about 2 SCFM product flow rate.

The foregoing discussions of the invention have focused on specific testing in the context of FTIR instrumentation. However, other instrumentation types have comparable technical requirements and needs for high quality purge and operating gas and, as in the FTIR, users of these other types of instrumentation face gas source alternatives which are less than optimum with the respect to the same aspects of convenience, stability, reliability and efficiency. Specific examples are most numerous in the context of expensive modern analytical instrumentation, for example, nuclear magnetic resonance (NMR) instruments require purge of the instrument's sample probe cavity. Generally, NMR instruments require purge gas dewpoints in the range of about −40° C. or less, at flow rates comparable to those encountered in the FTIR apparatus; however, at pressures somewhat higher than 30-35 psig (4.35-5.08×10³ Pa) of the FTIR moving mirrors. NMR instrument specifications indicate the pressures needed are typically 35 psig (5.08×10³ Pa) minimum, ranging to 40-60 psig (5.80-8.70×10³ Pa) depending on the NMR manufacturer's design and specific operating mode. This higher pressure requirement is of importance in that the above described membrane systems offer product gas at up to essentially the feed compressed gas pressure, as high as about 100 psig (1.45×10⁴ Pa) or higher. The nitrogen liquid boil off alternative is typically unable to exceed pressures of 30-35 psig (4.35-5.08×10³ Pa). The remaining key concern of the NMR application is gas purity with respect to contaminating oil from compressor systems. Such oil would undesirably introduce interfering proton signals into the sample probe and add spurious NMR signals to sample spectra. The use of oil filter element on the feed inlet to the membrane module effectively avoided oil contamination.

EXPERIMENTAL DETAILS

Fiber Spinning

All of the hollow fibers used in the described tests were spun by a standard wet spinning process. Deaerated sol (dope) was delivered at a rate of up to 20 ml/min to a tube-in-orifice type spinnerette. The spinnerette was maintained at a temperature between 15°-100° C. by the application of sufficient heat to maintain adequate sol flow. Water was injected into the fiber lumen at a rate of up to 10 ml/min to form the nascent hollow fiber which was drawn at a rate of up to 100 m/min. The fiber is drawn through water baths maintained at temperatures of up to ambient and above, but less than about 50° C. The hollow fiber is then washed with water. The fiber is then wound onto a bobbin and washed for up to 7 days in running water. Hanks (parallel bundles) of hollow fibers are then formed by skeining the fiber from the bobbin. These hanks are then hung vertically and dried rapidly at about 100° C.

Polysulfone hollow fiber membranes used in these tests were spun from a solution of polysulfone polymer (P-3500, Amoco Performance Polymers Co.) dissolved in a mixture of N-methylpyrrolidone solvent (57 weight percent) and propionic acid nonsolvent (43 weight percent). The spinning solution contained 37% polymer by weight. Fiber dimensions were typically 500/250 micrometer OD/ID. After spinning, washing and drying, bundles of the hollow fibers were potted into separator modules, which were coated with dilute solutions (about 0.5-2% by weight) silicone (Sylgard, Dow Corning Co.) in isopentane solvent. After coating, the isopentane solvent was evaporated to provide the finished coated separator module.

Separator Modules

Separator modules used were constructed of bundles of fibers, which were potted at each end in an encapsulating epoxy to yield tube sheets. Each tube sheet was cut perpendicular to the fiber axes to open and expose the bores or lumens of the fibers to form the double-ended separator configuration. The potted bundles were placed in a pressure vessel, such as aluminum or steel pipe, wherein o-ring gaskets effected a pressure tight seal between tube sheet and pressure vessel so as to isolate the bore feed inlet and bore exit (non-permeate) from the shell side (permeate) volume of the module. Feed compressed air was introduced into the bores at one end of the module at pressure (typically 85-110 psig, 1.23-1.60 $\times 10^4$ Pa) and the gas flowed through the bores of the fibers, during which flow time the gas was in contact with the separatory membrane. Fast permeating components in the feed (principally water vapor, $CO_2$ and to a lesser extent oxygen) were transported by permeation across the membrane to the low pressure shell side (permeate side) of the module. Slow permeability components of the feed (principally nitrogen and to an extent oxygen) were retained by the selective membrane and exited the bores of the fibers at the end of the module opposite the feed inlet end. The non-permeate product gas, which was substantially free of impurities such as water vapor and $CO_2$ initially present in the feed air, exited the module at essentially the same pressure as the feed gas, having undergone very little pressure drop through the module (less than 5 psig, 7.25 $\times 10^2$ Pa, under conditions of operation). The permeate (shell side) of the membrane module is vented to ambient atmospheric pressure (14.7 psia, 2.13 $\times 10^3$ Pa). Permeate gas flow is adequate to sweep transported water vapor and $CO_2$ out of the shell side of the module, thus maintaining a functionally low partial pressure of $H_2O$ and $CO_2$ on the permeate side of the membrane. The sweep maintains suitable partial pressure differential for $H_2O$ and $CO_2$ across the membrane to provide the necessary driving force for the separation via selective membrane permeation and transport.

Membrane modules tested were typically bundles of fibers of either 2"$\times$3', containing about 4500 fibers with a surface area of about 59,000 $cm^2$, or 4"$\times$5', containing about 20,000 fibers with surface area of about 440,000 $cm^2$.

Measurement Systems

Dewpoint (moisture content) of feed air and non-permeate product gas were measured using aluminum oxide sensor (Hygrometer System I, Panametrics Corp.).

Gas flow rates were measured using calibrated rotameters (Show Rate II, Series 1350, Brooks, Co.)

FTIR spectrometer (Nicolet Corp., Model 7199/170 SX electronics unit/optical unit) was used for spectroscopic analysis of $CO_2$ and $H_2O$ vapor content. Carbon dioxide peak at 2360 $cm^{-1}$ was calibrated for absorbance intensity vs. concentration according to Beer's Law (A=$\epsilon$lC, where A=absorbance intensity, $\epsilon$=$CO_2$ extinction coefficient at the absorbance band peak, l=sample Cell path length, and C= concentration of $CO_2$ in the analysis cell). Calibration gas for $CO_2$ was a known standard mixture of 27 ppm by volume $CO_2$ in nitrogen (Certified Standard, Air Products and Chemical Corp.) Water vapor absorbance in the infrared was monitored in the wavelength region of 1400-1800 $cm^{-1}$, where water absorbs infrared and exhibits a multiplet of bands. The most intense band at about 1560 $cm^{-1}$ was related to quantitative measurements of water concentration obtained from the dewpoint sensors.

Gas analysis in the infrared spectrometer employed a cell which permitted the adjustment of cell path length, over the range of 0.75 to 10. meters (Miran II, Wilkes Scientific Corp.). The long path cell had a volume of about 0.2 cubic feet. In conducting IR measurements of gas composition, the sample cell was initially evacuated then sample gas was flowed through the cell for a period of time adequate to purge the cell volume completely and to equilibrate the gas in the cell so as to accurately represent the gas composition of the sample. IR measurements were run to determine the time necessary for sample equilibration. At the sample gas flows utilized (10-15 standard cubic feet per hour (SCFH), the IR tests demonstrated that the sample cell volume was fully equilibrated in 16 minutes or less. Thus, for infrared analytical measurements, the cell was routinely allowed to equilibrate for at least 20-30 minutes. Precise calibration measurements for $CO_2$ yielded a value for the extinction coefficient at 2360 $cm^{-1}$ of 0.001156 AU·ppm$^{-1}$·meter$^{-1}$ for our cell and FTIR system, which was operated so as to perform at a resolution better than $\pm 2$ $cm^{-1}$.

We claim:

1. A process for generating instrument quality gas from compressed air, comprising;
    (a) contacting the compressed air with one side of a multicomponent, membrane comprised of a coated, graded-density skin membrane having macrovoid-free morphology;
    (b) permeating a majority of water vapor and carbon dioxide components contained in the compressed air through the membrane;
    (c) removing non-permeate from a chamber containing the membranes; and
    (d) supplying the non-permeate for instrumentation use, the non-permeate stream having a dewpoint reduced by 50° C. or more, said dewpoint measured at the non-permeate pressure, and a carbon dioxide content of less than about 40 ppm.

2. The process according to claim 1 wherein the non-permeate stream is delivered to the instrument at pressures greater than about 30 psig.

3. The process according to claim 2 wherein the instrument is comprised of a Fourier Transform Infrared analytical spectrometer.

4. The process according to claim 2 wherein the instrument is comprised of a nuclear magnetic resonance apparatus.

5. The process according to claim 1 wherein the multi-component membranes are selectively permeable to water vapor and carbon dioxide relative to air such that an excess loss of feed compressed air is avoided.

6. The process according to claim 5 wherein the multicomponent membranes have sufficient permeability of oxygen from the compressed air to provide a permeate sweep of the permeating water vapor.

7. The process according to claim 6 wherein the carbon dioxide content of the compressed air of at least 300 ppm by volume is reduced to from about 2 to about 40 parts per million.

8. The process according to claim 6 wherein the water vapor removal from the compressed air yields a non-permeate stream having a dewpoint of less than $-40°$ C. measured at the non-permeate pressure.

9. A process for purifying air of water vapor and carbon dioxide, comprising:

(a) contacting air with one side of multicomponent membranes comprised of coated graded-density skin membranes having macrovoid-free morphology, said membranes being selectively permeable to water vapor and carbon dioxide relative to air such that an excess loss of feed air is avoided;

(b) permeating sufficient water vapor and carbon dioxide impurity components contained in the air feed through the membranes; and (c) removing non-permeate from a chamber containing the membranes wherein the nonpermeate product is purified of water vapor to water vapor partial pressure levels of about 0.1 mmHg or less and the carbon dioxide content is reduced to from about 2 to about 40 parts per million by volume.

10. The process according to claim 9 wherein the air feed is compressed to at least one atmosphere pressure.

11. The process according to claim 9 wherein the multicomponent membranes have sufficient permeability of oxygen from the air to provide a permeate sweep of the permeating water vapor.

12. The process according to claim 10 wherein the water vapor removal from the compressed air yields a non-permeate stream having a dewpoint of less than about $-40°$ C. at non-permeate pressure.

* * * * *